(12) United States Patent
    Silberman et al.

(10) Patent No.: US 10,929,140 B2
(45) Date of Patent: *Feb. 23, 2021

(54) SCALABLE DEPENDENCY MATRIX WITH A SINGLE SUMMARY BIT IN AN OUT-OF-ORDER PROCESSOR

(71) Applicant: International Business Machines Corporation, Armonk, NY (US)

(72) Inventors: Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/826,734

(22) Filed: Nov. 30, 2017

(65) Prior Publication Data
US 2019/0163482 A1    May 30, 2019

(51) Int. Cl.
*G06F 9/30* (2018.01)
*G06F 9/38* (2018.01)

(52) U.S. Cl.
CPC .......... *G06F 9/3838* (2013.01); *G06F 9/3851* (2013.01)

(58) Field of Classification Search
CPC .................................................... G06F 9/3838
See application file for complete search history.

(56) References Cited

U.S. PATENT DOCUMENTS

| | | |
|---|---|---|
| 5,655,096 A | 8/1997 | Branigin |
| 5,689,674 A | 11/1997 | Griffith et al. |
| 5,710,902 A | 1/1998 | Sheaffer et al. |
| 6,065,105 A * | 5/2000 | Zaidi ............... G06F 9/3836 712/215 |
| 6,336,183 B1 | 1/2002 | Le et al. |
| 6,425,074 B1 | 7/2002 | Meier et al. |

(Continued)

OTHER PUBLICATIONS

International Search Report and Written Opinion for International Application No. PCT/IB2018/058800; International Filing Date: Nov. 9, 2018; dated Feb. 27, 2019, 9 pages.

(Continued)

*Primary Examiner* — David J. Huisman
(74) *Attorney, Agent, or Firm* — Cantor Colburn LLP; Jason Sosa

(57) ABSTRACT

Aspects of the invention include tracking dependencies between instructions in an issue queue. The tracking includes, for each instruction in the issue queue, identifying whether the instruction is dependent on each of a threshold number of instructions added to the issue queue prior to the instruction. The tracking also includes identifying whether the instruction is dependent on one or more other instructions in a group of instructions in the issue queue that were added to the issue queue prior to the instruction and that are not included in the threshold number of instructions that are tracked individually. A dependency between the instruction and the one or more other instructions in the group of instructions is tracked using a single summary bit that is set to indicate that a dependency exists between the instruction and the group of instructions. Instructions are issued from the issue queue based at least in part on the tracking.

13 Claims, 11 Drawing Sheets

(56) References Cited

U.S. PATENT DOCUMENTS

| | | | |
|---|---|---|---|
| 6,463,523 B1 | 10/2002 | Kessler et al. | |
| 6,553,480 B1 | 4/2003 | Cheong | |
| 6,557,095 B1* | 4/2003 | Henstrom | G06F 9/3836 712/207 |
| 6,728,866 B1 | 4/2004 | Kahle et al. | |
| RE38,599 E * | 9/2004 | Tremblay | G06F 9/3853 712/209 |
| 6,862,676 B1* | 3/2005 | Knapp | G06F 9/3836 711/108 |
| 6,931,639 B1 | 8/2005 | Eickemeyer | |
| 6,988,183 B1* | 1/2006 | Wong | G06F 9/30174 712/208 |
| 6,988,186 B2 | 1/2006 | Eickemeyer et al. | |
| 7,133,925 B2 | 11/2006 | Mukherjee et al. | |
| 7,219,249 B1 | 5/2007 | Ghose | |
| 7,464,253 B2 | 12/2008 | Veidenbaum et al. | |
| 7,472,258 B2 | 12/2008 | Burky | |
| 7,689,812 B2 | 3/2010 | Abernathy et al. | |
| 8,127,116 B2 | 2/2012 | Islam et al. | |
| 8,285,974 B2 | 10/2012 | Singh et al. | |
| 8,392,672 B1 | 3/2013 | Rhoades et al. | |
| 8,521,998 B2 | 8/2013 | Albernathy et al. | |
| 8,667,260 B2 | 3/2014 | Eichenberger et al. | |
| 8,930,432 B2 | 1/2015 | Hickey et al. | |
| 9,047,079 B2 | 6/2015 | Bruce et al. | |
| 9,058,180 B2 | 6/2015 | Golla et al. | |
| 9,146,774 B2 | 9/2015 | Busaba et al. | |
| 9,158,573 B2 | 10/2015 | Busaba et al. | |
| 9,298,466 B2 | 3/2016 | Buyuktosunoglu et al. | |
| 9,489,207 B2 | 11/2016 | Burky et al. | |
| 9,513,924 B2 | 12/2016 | Gschwind et al. | |
| 9,619,383 B2 | 4/2017 | Busaba et al. | |
| 2002/0053038 A1 | 5/2002 | Buyukosunoglu et al. | |
| 2003/0069920 A1 | 4/2003 | Melvin et al. | |
| 2004/0177239 A1 | 9/2004 | Clift et al. | |
| 2004/0215938 A1 | 10/2004 | Burky | |
| 2005/0038979 A1 | 2/2005 | Fischer et al. | |
| 2005/0243734 A1 | 11/2005 | Nemirovsky et al. | |
| 2006/0095732 A1 | 5/2006 | Tran | |
| 2009/0100249 A1 | 4/2009 | Eichenberger et al. | |
| 2009/0113181 A1 | 4/2009 | Comparan et al. | |
| 2009/0276608 A1* | 11/2009 | Shimada | G06F 9/3838 712/216 |
| 2010/0095087 A1 | 4/2010 | Eichenberger et al. | |
| 2010/0161942 A1 | 6/2010 | Bishop | |
| 2010/0262806 A1 | 10/2010 | Doing | |
| 2011/0153986 A1 | 6/2011 | Alexander et al. | |
| 2011/0302392 A1 | 12/2011 | Abernathy et al. | |
| 2012/0233441 A1 | 9/2012 | Barreh | |
| 2013/0205118 A1 | 8/2013 | Buyuktosunoglu et al. | |
| 2014/0351562 A1 | 11/2014 | Spadini | |
| 2015/0106595 A1 | 4/2015 | Khot et al. | |
| 2015/0220342 A1* | 8/2015 | Glossner | G06F 9/3822 712/216 |
| 2016/0117172 A1 | 4/2016 | Alexander et al. | |
| 2016/0202988 A1 | 7/2016 | Ayub et al. | |
| 2017/0132010 A1 | 5/2017 | Vasekin et al. | |
| 2017/0235577 A1 | 8/2017 | Brownscheidle | |
| 2017/0344374 A1 | 11/2017 | Friedmann | |
| 2018/0232234 A1 | 8/2018 | Alexander | |
| 2019/0163483 A1 | 5/2019 | Silberman | |
| 2019/0163484 A1 | 5/2019 | Silberman | |
| 2019/0163485 A1 | 5/2019 | Karve | |
| 2019/0163486 A1 | 5/2019 | Sinharoy | |
| 2019/0163488 A1 | 5/2019 | Karve | |
| 2019/0163489 A1 | 5/2019 | Karve | |
| 2019/0163490 A1 | 5/2019 | Silberman | |
| 2019/0163491 A1 | 5/2019 | Silberman | |
| 2020/0150969 A1 | 5/2020 | Silberman et al. | |

OTHER PUBLICATIONS

List of IBM Patents or Patent Applictions Treated as Related; (Appendix P), Filed Nov. 30, 2017.

Akkary et al., "Checkpoint processing and recovery: Towards scalable large instruction window processors." Microarchitecture, 2003. MICRO-36. Proceedings. 36th Annual IEEE/ACM International Symposium on. IEEE, 2003, 12 pages.

Alastruey et al. "Selection of the Register File Size and the Resource Allocation Policy on SMT Processors." Computer Architecture and High Performance Computing, 2008. SBAC-PAD'08. 20th International Symposium on. IEEE, 2008, 8 pages.

Anonymously; "An extensible, scalable, optimized multithreaded data loading framework for software applications"; http://ip.com/IPCOM/000240374D; Jan. 28, 2015, 8 pages.

Anonymously; "Method and Apparatus for Hardware Assisted Function Shipping"; http://ip.com/IPCOM/000199436D; Sep. 3, 2010, 7 pages.

Anonymously; "System of Programmable Mode Control within an Instruction Sequencing Unit for Management of Power within a Microprocessor"; http://ip.com/IPCOM/000217762D; May 11, 2012, 2 pages.

Anonymously; "VSU/FXU Powergating"; http://ip.com/IPCOM/000216899D; Apr. 23, 2012, 2 pages.

Daniele Folegnani et al., "Energy Effective Issue Logic" ISCA '01, Proceedings of the 28th annual international symposium on Computer architechture, pp. 230-239 (Year:2001).

Duong et al., "Compiler Assisted Out-Of-Order Instruction Commit." Center for Embedded Computer Systems, University of California, Irvine (2010), 27 pages.

Ergin et al. "Increasing processor performance through early register release." Computer Design: VLSI in Computers and Processors, 2004. ICCD 2004. Proceedings. IEEE International Conference on. IEEE, 2004, 8 pages.

Herlihy et al., . Transactional memory: Architectural support for lock-free data structures. vol. 21. No. 2. ACM, 1993, 41 pages.

IBM; "Instruction Steering Policy for Balanced Utilization of a Bifurcated Unified Issue Queue"; http://ip.com/IPCOM/000179961D; Mar. 3, 2009, 3 pages.

International Search Report and Written Opinion for International Application No. PCT/IB2018/058801, International Filing Date: Nov. 9, 2018; dated Jan. 21, 2019, 9 pages.

International Search Report/Written Opinion for International Application No. PCT/IB2018/058799, International Filing Date: Nov. 9, 2018; dated Feb. 12, 2019, 9 pages.

Koufaty et al., "Hyperthreading technology in the netburst microarchitecture." IEEE Micro 23.2 (2003): pp. 56-65.

Martinez et al. "Cherry: Checkpointed early resource recycling in out-of-order microprocessors." Microarchitecture, 2002.(MICRO-35). Proceedings. 35th Annual IEEE/ACM International Symposium on. IEEE, 2002, 12 pages.

Mericas, A.; "Performance Characteristics of the POWER8 Processor"; IBM Corporation, IBM Systems & Technology Group Development; 2014, 26 pages.

Ramírez et al., "Direct Instruction Wakeup for Out-Of-Order Processors," Proc Innovative Architecture for Future Generation High-Performance Processors and Systems, IEEE, 2004, 8 Pages.

Shum et al., "IBM zEC12: The third-generation high-frequency mainframe microprocessor." IEEE Micro 33.2 (2013): pp. 38-47.

Subramaniam et al., "Store Vectors for Scalable Memory Dependence Prediction and Scheduling," Proc of the 12th Intl Symp on High-Performance Computer Architecture, IEEE, 2006, 12 pages.

Tendler, JM. et al.; "POWER4 System microarchitecture"; IBM Corporation, IBM Research & Development; vol. 46, No. 1; Jan. 2002, 21 pages.

\* cited by examiner

SCALABLE DEPENDENCY MATRIX WITH A SINGLE SUMMARY BIT IN AN OUT-OF-ORDER PROCESSOR

BACKGROUND

Embodiments of the present invention relate in general to an out-of-order (OoO) processor and more specifically to a scalable dependency matrix with a single summary bit in an issue queue of an OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues.

The ISU includes one or more issue queues that contain dependency matrices for tracking dependencies between instructions. A dependency matrix typically includes one row and one column for each instruction in the issue queue. As the number of instructions in the issue queues continues to increase, the amount of space and power taken up by each of the dependency matrices is growing.

SUMMARY

Embodiments of the present invention include methods, systems, and computer program products for implementing a scalable dependency matrix with a single summary bit in an issue queue of an out-of-order (OoO) processor. A non-limiting example method includes tracking dependencies between instructions in an issue queue. The tracking includes, for each instruction in the issue queue, identifying whether the instruction is dependent on each of a threshold number of instructions added to the issue queue prior to the instruction. A dependency between the instruction and each of the threshold number of instructions is tracked individually. The tracking also includes, for each instruction in the issue queue, identifying whether the instruction is dependent on one or more other instructions in a group of instructions that includes instructions in the issue queue that were added to the issue queue prior to the instruction and that are not included in the threshold number of instructions that are tracked individually. A dependency between the instruction and the one or more other instructions in the group of instructions is tracked by indicating that the instruction is dependent on the group of instructions. Instructions are issued from the issue queue based at least in part on the tracking. The dependency between the instruction and the group of instructions is tracked using a single summary bit that is set to indicate that a dependency exists between the instruction and the group of instructions. Subsequent to the single summary bit being set, the single summary bit is reset to indicate that the dependency no longer exists between the instruction and the group of instructions based at least in part on detecting that all of the instructions in the group of instructions have been issued from the issue queue.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
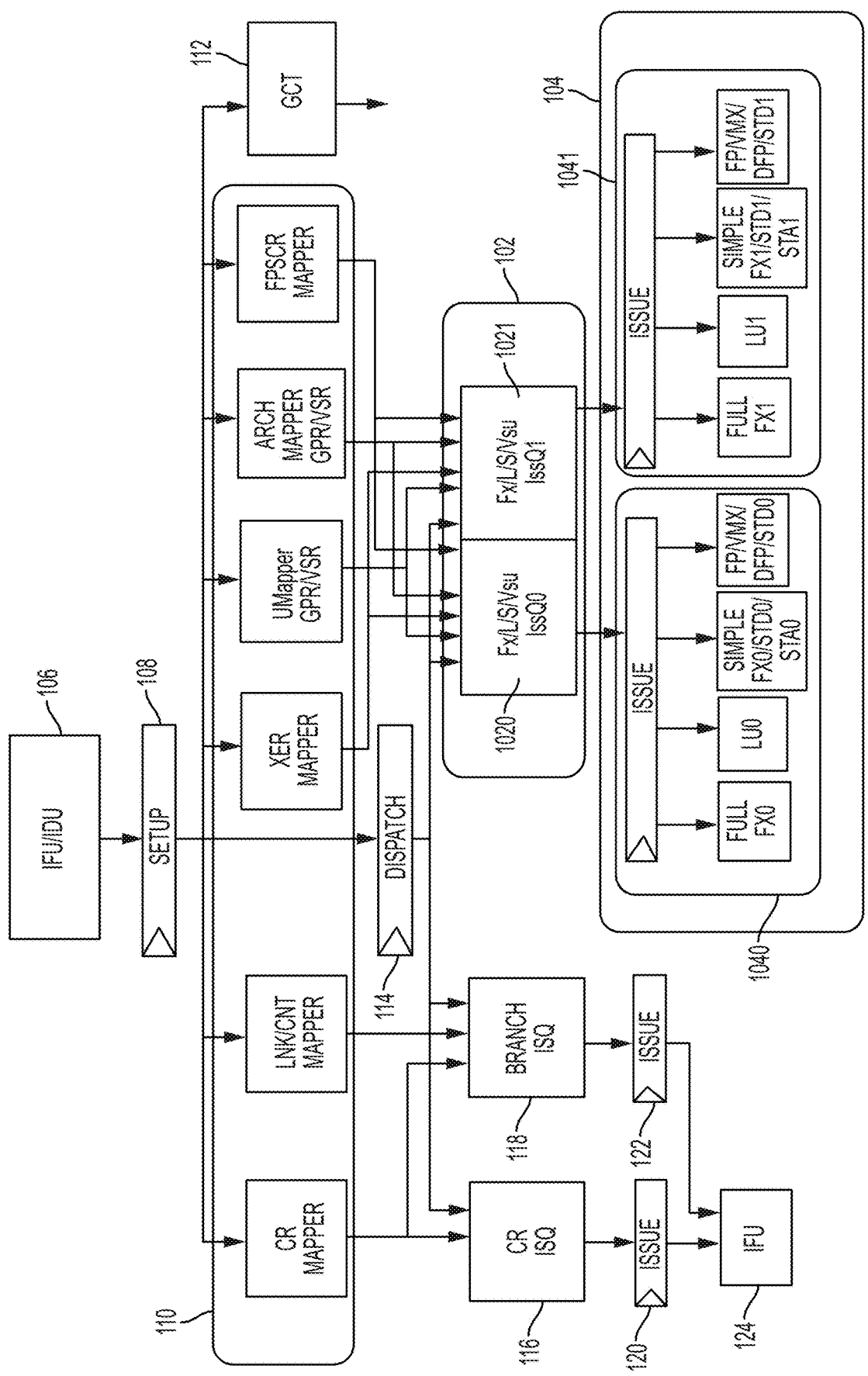
FIG. 1 depicts a block diagram of a system that includes an instruction sequencing unit (ISU) of an out-of-order (OoO) processor for implementing a scalable dependency matrix with a summary bit in an issue queue accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

As mentioned above, the number of instructions stored in contemporary issue queues continues to increase. Contemporary issue queues include dependency matrices that grow as the square of the number of instructions, and at some point the ever expanding size of the dependency matrices are likely to have an impact on timing. One or more embodiments of the present invention described herein provide a reduced sized dependency matrix in an issue queue of an instruction sequencing unit (ISU) of an out-of-order (OoO) processor. The reduction in sized is based on the recognition that dependencies typically exist between instructions that are added to the issue queue within a close timeframe of each other. Dependencies of an instruction on instructions that are within the close timeframe of the instruction being added to the issue queue are tracked individually in accordance with one or more embodiments of the present invention. Dependencies of the instruction on instructions that are outside of the close timeframe of the instruction being added to the issue queue are tracked as a single group using a summary bit in accordance with one or more embodiments of the present invention.

In accordance with one or more embodiments of the present invention, for a processor running in a single-thread (ST) mode with an issue queue that holds sixty-four instructions (N=64), the dependency of an instruction on the previous thirty-two instructions (N/2) can be tracked with specificity (e.g., identifying exact instruction(s)) in the issue queue. A summary bit can be used to indicate that the instruction is dependent on any instruction further back than N/2. An entry (instruction) in the dependency matrix of the issue queue with the summary bit set has to wait until the oldest N/2 entries are cleared before indicating that the instruction is ready to be issued. This combination of precise tracking (N/2 back) and imprecise tracking (summary bit further than N/2 back) along with implementing the issue queue as a first-in-first-out (FIFO) queue allows the dependency matrix to be scalable and logically implemented as a trapezoid which can be physically stored in a manner to save storage space. In addition, implementing the issue queue as a FIFO queue saves additional storage space by eliminating the need for an age array to be included in the issue queue. In accordance with one or more embodiments of the present invention, when the processor is executing in a simultaneous multi-threading (SMT) mode, the summary bit is not utilized and the amount of precise tracking remains the same as contemporary implementations that track all of the N/2−1 previous instructions belonging to a given thread.

In accordance with one or more embodiments of the present invention, the group of instructions that are outside of the close timeframe of the instruction being added to the issue queue (i.e., those instructions not being tracked with specificity) are broken down into one or more sub-groups which are each tracked with their own summary bit. In these embodiments, multiple summary bits are utilized to track dependencies of an instruction on instructions in the group of instructions.

In accordance with one or more embodiments of the present invention, the number of previous instructions being tracked with specificity is selectable/programmable and not limited to the N/2 previous instructions.

Turning now to FIG. 1, a block diagram of a system that includes an instruction sequencing unit (ISU) of an out-of-order (OoO) processor for implementing a scalable dependency matrix with a summary bit in an issue queue is generally shown according to one or more embodiments of the present invention. The system shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in SMT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in SMT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
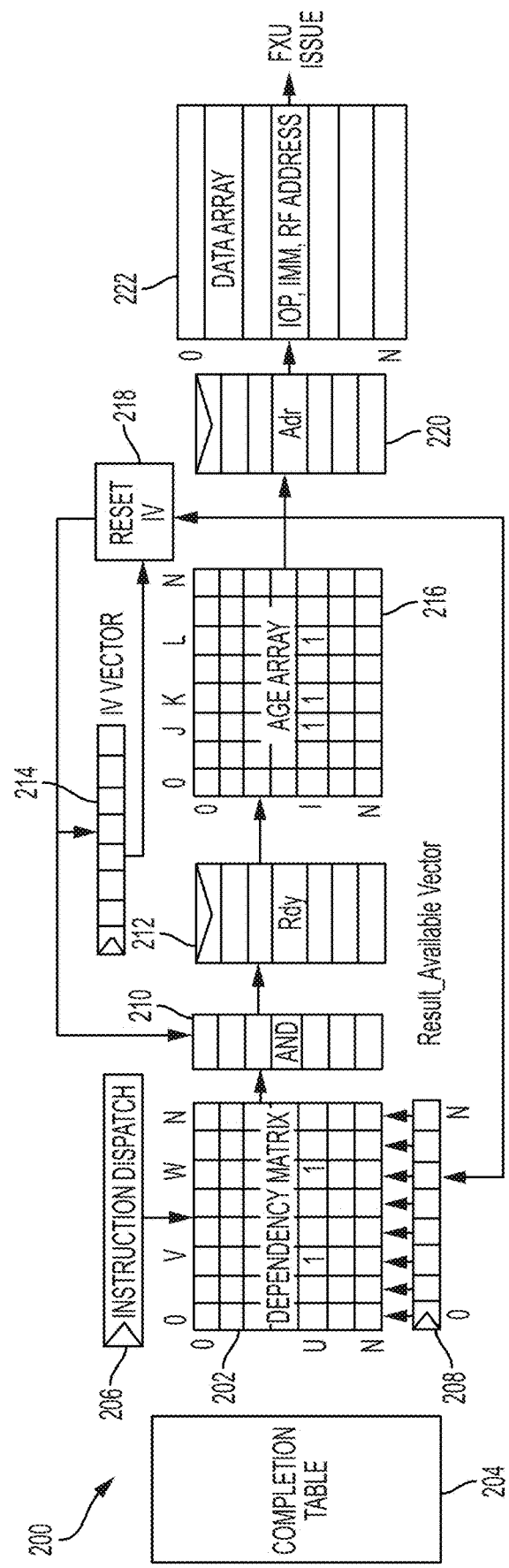
FIG. 2 depicts a block diagram of an issue queue in an ISU of an OoO processor in accordance with one or more embodiments of the present invention.

Turning now to FIG. 2, a block diagram of an issue queue 200 is generally shown according to one or more embodiments of the present invention. The issue queue 200 shown in FIG. 2 includes matrices, tables, and vectors for tracking instructions that are waiting to be issued. The matrices and tables each include a corresponding row for each instruction being tracked, and the vectors include an entry for instructions being tracked. As the number of instructions in the issue queues continues to increase, the amount of space and power taken up by each of the matrices, tables, and vectors is growing. Embodiments of the present invention described herein can be used to reduce the size of a dependency matrix 202 in the issue queue 200 by using a summary bit for tracking dependencies on older instructions. In addition, by storing instructions in the order received into the issue queue 200, the age array 216 can be eliminated from the issue queue 200.

The issue queue 200 tracks instructions that are waiting for execution by an execution unit. An instruction is dispatched and allocated to the issue queue 200 (e.g., CR ISQ 116, Branch ISQ 118, issue queue 102). The instruction is ready to issue from the issue queue 200 when its dependencies are satisfied, that is when the instructions have issued and their corresponding results are available. The issue queue 200 issues the instruction to an execution unit (e.g., execution unit 104). After issuing the instruction, the issue queue 200 continues to track the instruction at least until the instruction passes a rejection point. The rejection point is different for different instructions and refers to the point where it is known that the instruction will not have to be reissued (e.g., in a read memory operation the rejection point can be passed once the cache is accessed for the read data). Once the instruction has passed the rejection point it can be deallocated from the issue queue and the entry in the issue queue is cleared for reuse by a new instruction. The instruction finishes once the execution of the instruction, by an execution unit, has completed.

The issue queue 200 shown in FIG. 2 includes: a dependency matrix 202 for tracking dependencies between instructions in the issue queue 200; a completion table 204 for indicating that the execution of an instruction has passed the rejection point and the instruction can be deallocated from the issue queue 200; an instruction dispatch unit 206 (e.g., dispatch unit 114 in FIG. 1) for receiving instructions to add to the issue queue; a result-available vector 208 for indicating that all of the instructions that the instruction is dependent on have issued; an IV vector 214 that indicates the instructions that are valid and issuable; AND logic 210 that logically ANDs the output of the dependency matrix with the IV vector; a ready vector 212 for indicting that the results from all of the instructions that the instruction is dependent on are available and the instruction is valid and issuable; an age array 216 for tracking the order that the instructions came into the issue queue so that when two or more instructions are ready for execution, older instruction can be selected before newer instruction; a reset IV control 218 for updating the IV state to prevent re-issue of a selected instruction or permit re-issue after rejection; an address 220 used as a read index corresponding to the instruction selected for issue; and a data array 222 containing the text of the instruction that is used by the execution unit for executing the instruction (e.g., an opcode, a pointer to a register file address, immediate data).

As shown in the dependency matrix 202 of FIG. 2 which can track N instructions that are waiting in the issue queue, an instruction at position "U" depends on the instructions at position "V" and "W". The dependency matrix 202 shown in FIG. 2 has N rows and N columns, one row and column for each instruction in the issue queue. As shown in the age array 216 of FIG. 2, instructions at positions "J" "K", and "L" are older than the instruction at position "I".

Figure 3:
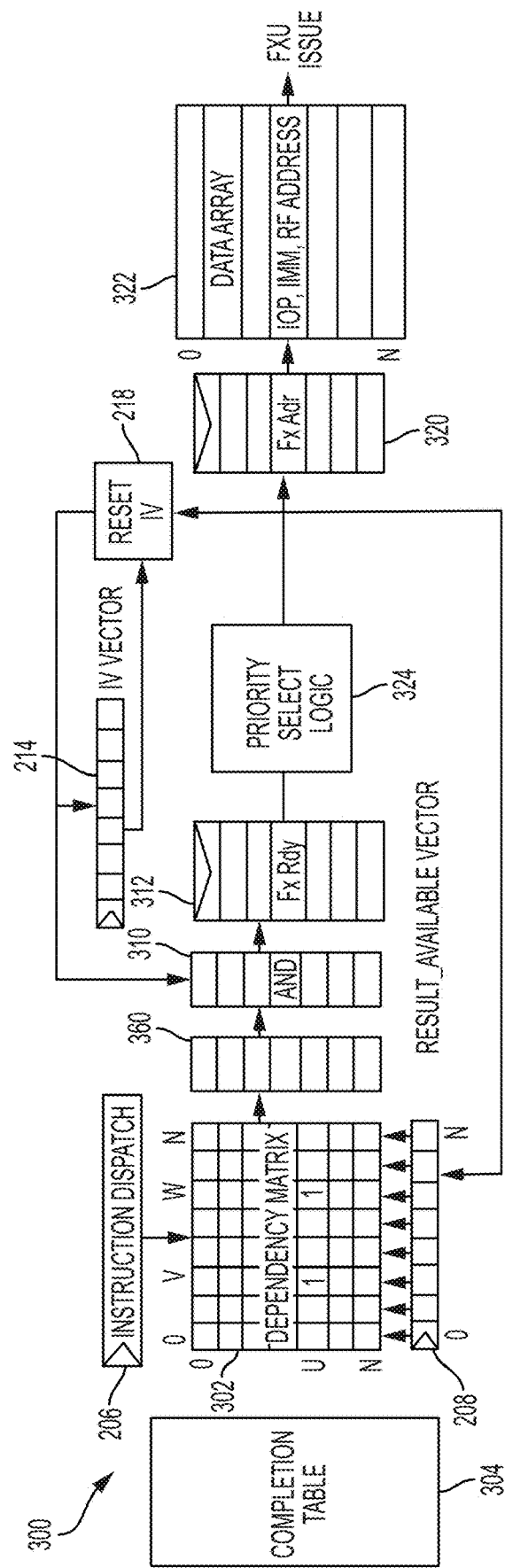
FIG. 3 depicts a block diagram of an issue queue in an ISU of an OoO processor for implementing a scalable dependency matrix with a summary bit in accordance with one or more embodiments of the present invention.

Turning now to FIG. 3, a block diagram of an issue queue 300 in an ISU of an OoO for implementing a scalable dependency matrix with a summary bit portion 360 is generally shown in accordance with one or more embodiments of the present invention. The issue queue 300 shown in FIG. 3 is similar to the issue queue 200 described above with reference to FIG. 2 except that the instructions are inserted into the matrices, tables, and vectors in FIFO order and there is no need for the logic or circuitry associated with the age array 216 shown in FIG. 2 because the instructions are inserted into the matrices, tables, and vectors in the order that they were received. In place of the age array 216 of FIG. 2, the issue queue 300 shown in FIG. 3 includes priority select logic 324 for selecting between two or more ready instructions based on their relative positions in the issue queue 200. Thus, the dependency matrix 302, completion table 304, AND vector 310, ready vector 312, address 320, and data array 322 contain corresponding entries that are in the order that they were received from the instruction dispatch unit 206. In addition, a summary bit portion 360 is provided for each entry in the dependency matrix 302 to track dependencies on older instructions. The summary bit portion 360 can include one or more summary bits.

Figure 4:
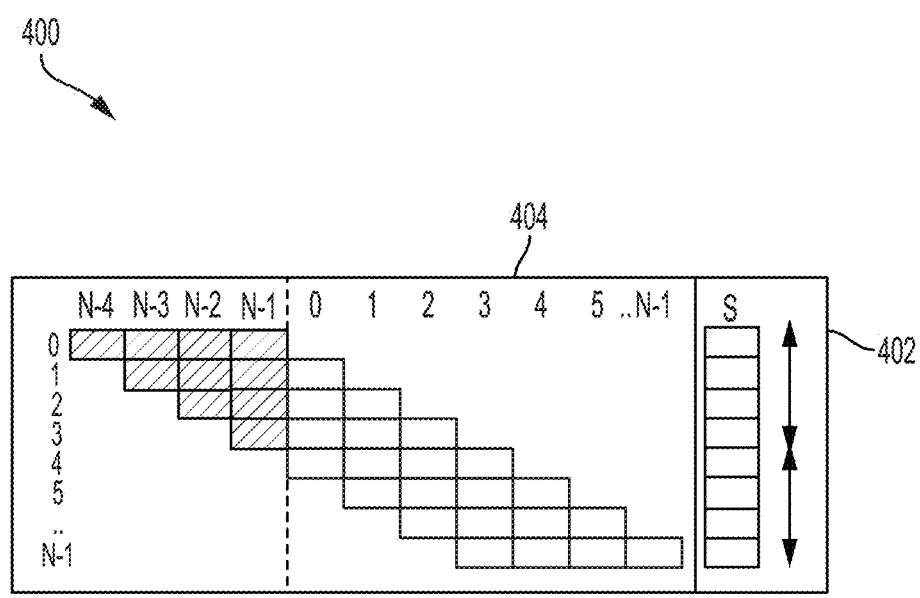
FIG. 4 depicts a block diagram of a logical view of a scalable dependency matrix in accordance with one or more embodiments of the present invention.

Turning now to FIG. 4, a block diagram of a logical view of a scalable dependency matrix 400 is generally shown according to one or more embodiments of the present invention. The scalable dependency matrix 400 shown in FIG. 4 represents an issue queue that holds N instructions and tracks with specificity a dependency of an instruction on four (the threshold in this example) other instructions. The entries in the scalable dependency matrix 400 are inserted in FIFO order and thus, for example, the instruction in row 5 was received into the issue queue immediately before the instruction in row 6.

In accordance with one or more embodiments of the present invention, the scalable dependency matrix 400 can wrap-around and thus, for example, the instruction in row N–1 was received into the issue queue immediately before the instruction in row 0. When wrap-around of circular queue is utilized head and tail pointers can be used to track oldest and youngest entries, and the summary bit is cleared when the head pointer (oldest entry) advances. As a result, all summary bits that are now closer to the head than the threshold (e.g., 4) are cleared since the head pointer only advances when entries are deallocated, which requires that the corresponding instructions have issued and passed their reject points.

In one or more exemplary embodiments, instead of using a wrap-around matrix, instructions are shifted within the queue toward the top row whenever space is made available to shift upward as queue positions are deallocated. The contents of the matrix can shift up and left an equal amount. In this case, only the open (unshaded) boxes in FIG. 4 are needed, and as the matrix takes on a trapezoidal shape.

As shown in FIG. 4, a dependency between an instruction and the four instructions inserted into the issue queue immediately prior to the instruction are tracked with specificity and individually identified in a first portion, a specificity portion 404, of the dependency matrix 400; while a dependency between the instruction and any of the other instructions in the issue queue is tracked using a summary bit portion 402 of the dependency matrix 400.

The specificity portion 404 of the dependency matrix 400 shown in FIG. 4 can be used, for example, to determine whether the instruction in row 6 is dependent on the instruction in row 5, whether the instruction in row 6 is dependent on the instruction in row 4, whether the instruction in row 6 is dependent on the instruction in row 3, and whether the instruction in row 6 is dependent on the instruction in row 2. If the instruction in row 6 is dependent on the instruction in row 3 and not the instructions in rows 5, 4, and 2 (and the summary bit is not set), then only the instruction in row 3 has to issue before the instruction in row 6 is ready to be issued. The summary bit portion 402 of the dependency matrix 400 can be used to determine whether the instruction in row 6 is dependent on any of the instructions in rows 0 through 1 and rows 7 through N−1. A single summary bit can represent the dependency of row 6 on any of row 0 through 1 and rows 7 through N−1, and thus if a dependency is identified by the summary bit, all of the instructions in row 1 and rows 7 through N−1 must be issued before the instruction in row 6 can be issued. As described herein, the summary bit or specificity bit is cleared when the corresponding instruction is deallocated.

In accordance with one or more embodiments of the present invention, the summary bit portion 402, or other latch, for the instruction in row 6 is set when the instruction is dependent on any of the instructions in row 0 through 1 and rows 7 through N−1 and reset when all of the instructions in row 1 and rows 7 through N−1 that were present in the issue queue when instruction 6 was dispatched are issued, have passed their respective reject point and been de-allocated. Similarly, a corresponding bit, or other latch, in the specificity portion 404 is set to indicate a dependency of the instruction in row 6 on a specific prior instruction, and reset when the instruction has issued, passed its reject point and the entry has been de-allocated. Once all of the dependencies of the instruction in row 6 are satisfied (e.g., the instructions are issued) the instruction in row 6 is ready to issue once all of the resources that it requires are available.

The summary bit portion 402 shown in FIG. 4 can include a single summary bit that is used to track a dependency between an instruction and any of more than a threshold number of instructions inserted into the issue queue immediately prior to the instruction. In the embodiment of the present invention shown in FIG. 4, the threshold is four and instructions in the issue queue other than the four instructions inserted into the issue queue immediately prior to the instruction are tracked as a single group using a single summary bit. The single group includes all of the instructions in the issue queue besides the instruction and the four instructions (the threshold is four in this example) inserted into the issue queue immediately prior to the instruction. Thus, if the instruction is dependent on one of the instructions in the single group it must wait until all of the instructions in the single group have issued (and passed their reject points) before the dependency is satisfied. The instruction can then issue if all other dependencies have been satisfied. The single summary bit is reset only when all of the instructions in the single group have been issued (and passed their reject points) from the issue queue.

In accordance with one or more embodiments of the present invention, the summary bit portion 402 shown in FIG. 4 includes multiple summary bits that are used to track dependencies between an instruction and any of more than a threshold number of instructions inserted into the issue queue immediately prior to the instruction. In embodiments of the present invention, instructions in the issue queue other than the threshold number of instructions inserted into the issue queue immediately prior to the instruction are tracked as multiple groups using multiple summary bits. Each of the other instructions in the issue queue besides the instruction and the threshold number of instructions inserted into the issue queue immediately prior to the instruction are included in at least one of the groups. Contents of the multiple groups can be mutually exclusive or they can overlap. The use of multiple summary bits for multiple groups can provide finer granularity than the use of a single summary bit for any instructions not tracked with specificity.

A simplified example for ease of description follows, where N=16, the threshold is N/2=8 and an instruction is inserted at row 15 in an issue queue which includes rows 0 through 15. Any dependency of the instruction in row 15 on the eight instructions inserted into the issue queue immediately prior to the instruction in row 15 (that is the instructions in rows 14, 13, 12, 11, 10, 9, 8, and 7) are tracked with specificity. Thus it can be determined exactly which one or more, if any, of the instructions in rows 14, 13, 12, 11, 10, 9, 8, and 7 of the issue queue that the instruction in row 15 is dependent on. Multiple summary bits representing dependencies on instructions in groupings of instructions at rows 0, 1, 2, 3, 4, 5, and 6 can be implemented by exemplary embodiments of the present invention. For example, a first group can include instructions in rows 3, 4, 5, and 6 in the issue queue and a second group can include instructions in rows 0, 1, and 2 in the issue queue. A dependency of the instruction in row 15 on instructions in the first group can be tracked with a first summary bit and the second group tracked with a second summary bit. Alternatively, a first group can include instructions in rows 3, 4, 5 in the issue queue, a second group can include instructions at rows 6 and 2 in the issue queue, and a third group can include instructions at rows 0 and 1 in the issue queue. A dependency of the instruction in row 15 on instructions in the first group can be tracked with a first summary bit, the second group tracked with a second summary bit, and the third group with a third summary bit. In another alternative the groups can overlap, for example with a first group including instructions in rows 0, 1, 2, 3, 4, 5, and 6 in the issue queue and a second group including instructions in rows 0, 1, and 2 in the issue queue.

The foregoing are just examples, as any number of groups of instructions and corresponding summary bits can be implemented by exemplary embodiments of the present invention. In general, the larger the number of groups and summary bits the higher the cost in terms of the number of bits to track and the lower the cost in terms of throughput. Exemplary embodiments of the present invention can be tailored to adjust the granularity based on implementation requirements. The two extremes include a single summary bit that provides the coarsest granularity and a summary bit for every instruction that provides the finest granularity.

Figure 5:
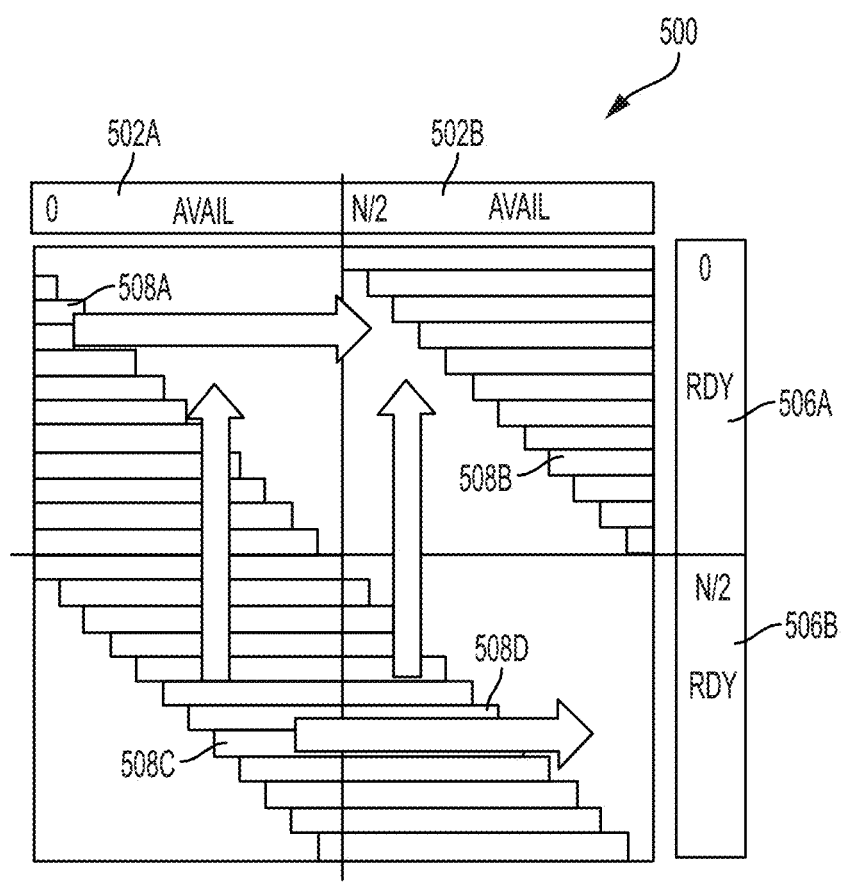
FIG. 5 depicts a block diagram of a trapezoidal dependency matrix in accordance with one or more embodiments of the present invention.

Turning now to FIG. 5, a block diagram of a trapezoidal dependency matrix 500 is generally shown according to one or more embodiments of the present invention. As shown in FIG. 5, the scalable dependency matrix can result in open space in the dependency matrix, for example in the specificity portion 404 of the dependency matrix 400 shown in FIG. 4. Specificity portions 508A, 508B, 508C, and 508D are contained in non-contiguous portions of the trapezoidal dependency matrix 500 shown in FIG. 5. Also shown in FIG. 5 is a ready vector having an entry corresponding to each instruction to indicate if all of the dependencies of an instruction have been satisfied (e.g., all of the specific instructions have issued). The ready vector shown in FIG. 5 is broken up into ready status vector 506A and ready status vector 506B. FIG. 5 also shows an available vector having an entry corresponding to each instruction to indicate if all of the results from previously issued instructions that the instruction is dependent on are available for use by the instruction. The available vector shown in FIG. 5 is broken up into available vector 502A and available vector 502B. An additional column of bits, not shown in FIG. 5, holds the summary bit; and, additional logic prevents the ready vector from indicating an instruction is ready if the summary bit is set.

Figure 6:
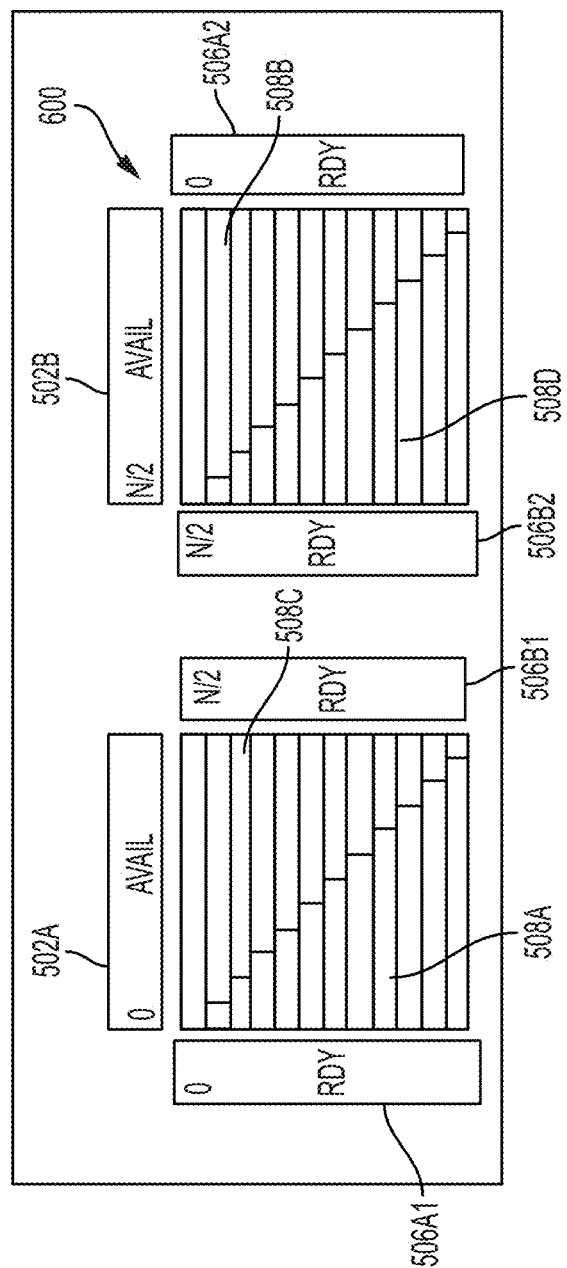
FIG. 6 depicts a block diagram of a trapezoidal dependency matrix compacted vertically in accordance with one or more embodiments of the present invention.

Turning now to FIG. 6, a block diagram of a trapezoidal dependency matrix compacted vertically 600 is generally shown according to one or more embodiments of the present invention. As shown in FIG. 6, the trapezoidal dependency matrix 500 of FIG. 5 is merged in a vertical manner to remove the open space between the specificity portions 508A, 508B, 508C, and 508D. The trapezoidal dependency matrix compacted vertically 600 is one way of physically storing the scalable dependency matrix in accordance with one or more embodiments of the present invention to reduce space requirements. Availability information contained in 502A is used to determine whether a dependence indicated with specificity by bits in 508A is satisfied, and ready status 506A1 is updated accordingly. Availability information contained in 502A is simultaneously used to determine whether a dependence indicated with specificity by bits in 508C is satisfied, and ready status 506B1 is updated accordingly. Similarly, the availability information in 502B is used to determine whether the dependences indicated by bits in 508B and 508D are satisfied so that ready status 506A2 and 506B2, respectively, can be updated. Corresponding elements of both components of the ready status (506A1 and 506A2 or 506B1 and 506B2) must indicate that the specific dependencies are satisfied to signify that all dependencies are satisfied.

Figure 7:
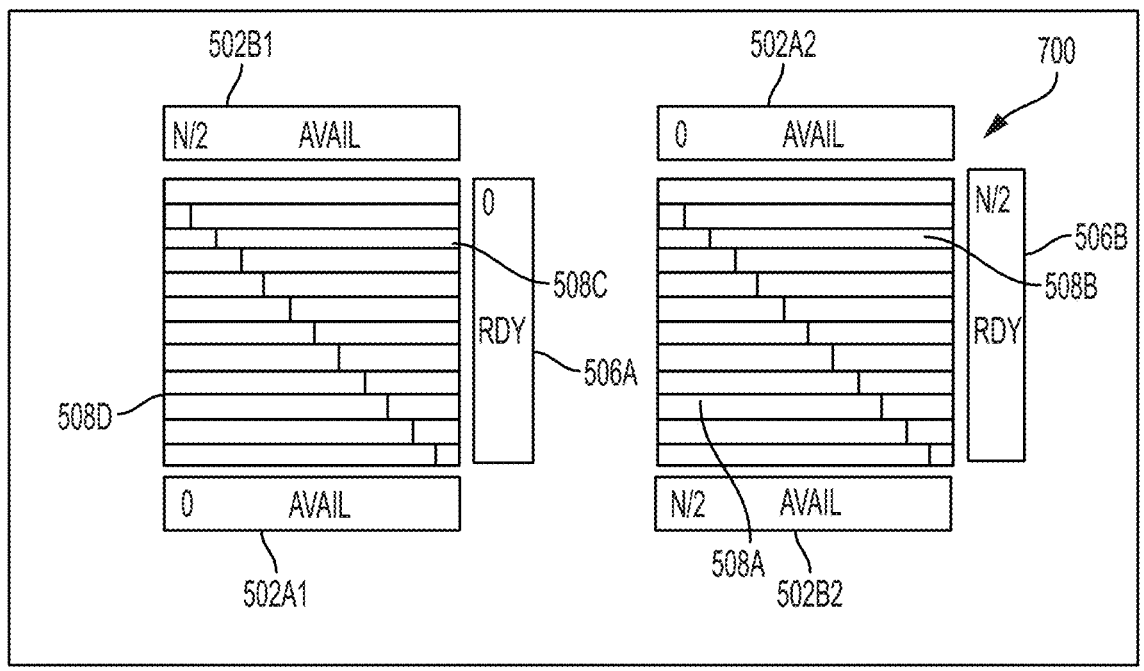
FIG. 7 depicts a block diagram of a trapezoidal dependency matrix compacted horizontally in accordance with one or more embodiments of the present invention.

Turning now to FIG. 7, a block diagram of a trapezoidal dependency matrix compacted horizontally 700 is generally shown according to one or more embodiments of the present invention. As shown in FIG. 7, the trapezoidal dependency matrix 500 of FIG. 5 is merged in a horizontal manner to remove the open space between the specificity portions 508A, 508B, 508C, and 508D. The trapezoidal dependency matrix compacted horizontally 700 is one way of physically storing the scalable dependency matrix in accordance with one or more embodiments of the present invention to reduce space requirements. Availability information contained in 502A1 is used to determine whether a dependence indicated with specificity by bits in 508D is satisfied while simultaneously availability information contained in 502B1 is used to determine whether a dependence indicated with specificity by bits in 508C is satisfied, and ready status vector 506A is updated with the combined result accordingly. Availability information contained in 502A2 is used to determine whether a dependence indicated with specificity by bits in 508B is satisfied while simultaneously availability information contained in 502B2 is used to determine whether a dependence indicated with specificity by bits in 508A is satisfied, and ready status vector 506B is updated with the combined result accordingly.

Either of the trapezoidal dependency matrix compacted vertically 600 shown in FIG. 6 or the trapezoidal dependency matrix compacted horizontally 700 shown in FIG. 7 can be selected for implementation based, for example, on expected types of system workflow.

Figure 8:
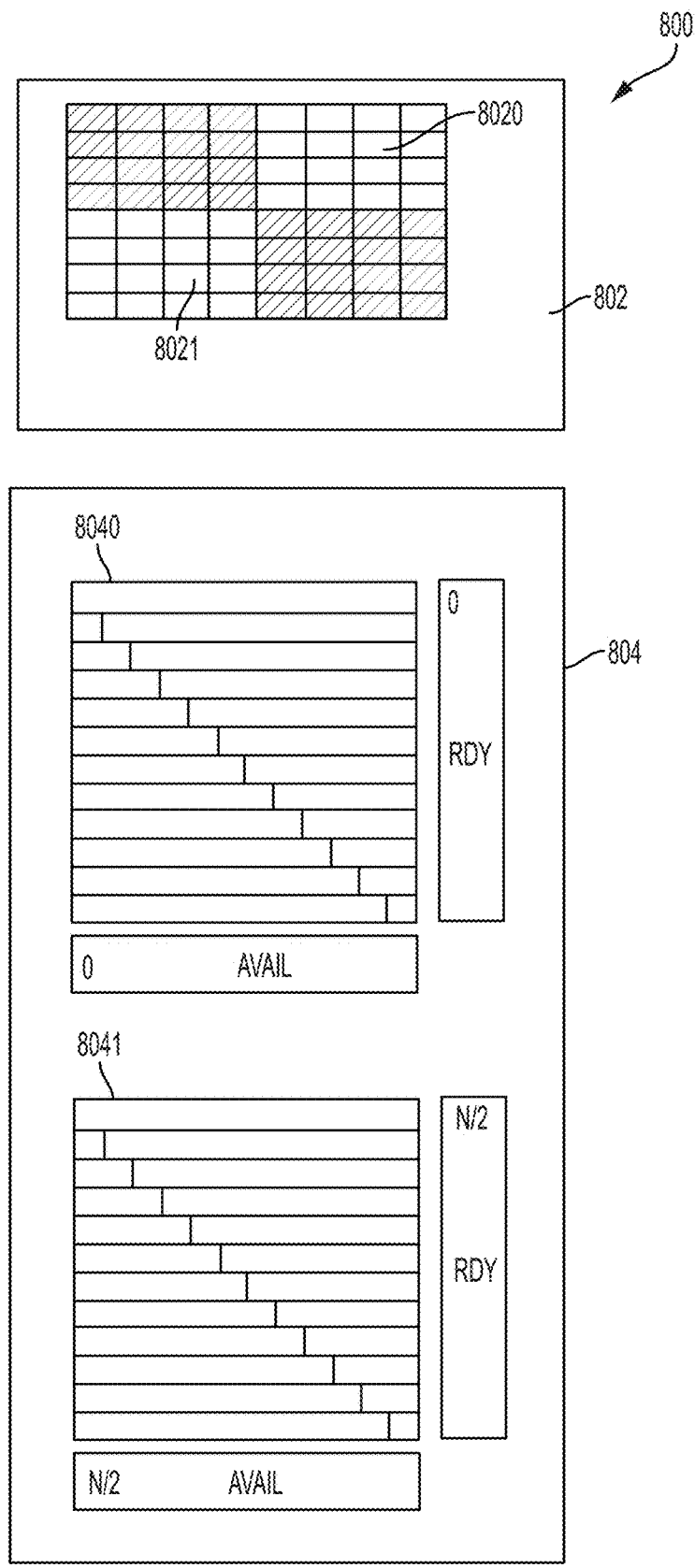
FIG. 8 depicts a block diagram of a scalable dependency matrix that can be implemented in accordance with one or more embodiments of the present invention.

Turning now to FIG. 8, a block diagram of dependency matrix 800 is generally shown according to one or more embodiments of the present invention. As shown in FIG. 8, when the processor is executing in a SMT mode, a first thread uses portion 8020 of logical dependency matrix 802 and the second thread uses portion 8021 of logical dependency matrix 802. The logical dependency matrix 802 can be physically stored as physical dependency matrix 804 which includes a matrix 8040 for storing contents of portion 8020 and a matrix 8041 for storing contents of portion 8021.

As described herein, when an OoO processor is executing in ST mode, the entire dependency matrix in the issue queue is used to track dependencies between instructions. This is contrasted with when the OoO processor is executing in SMT mode where typically only half of the dependency matrix is utilized. As described herein, in accordance with embodiments of the present invention, the dependency matrix in the issue queue is re-organized so that logically it is a trapezoid. In ST mode, an entry can directly track dependency to the previous N/2 entries and beyond that it can only track a collective dependency through a summary bit. An entry (instruction) with a summary bit set has to wait until the oldest (up to) N/2 entries are cleared. The same concept can be used for tracking fewer than N/2 entries with specificity. Exemplary embodiments of the present invention can also be used when the processor is executing in SMT mode to track full dependency (i.e., with specificity) of N/2 entries in each half of the issue queue. When the processor is executing in ST mode it can track N entries but with limited visibility to the older half of the entries. Such an embodiment is shown in FIG. 9 which generally shows a block diagram of a dependency matrix 900 operating in a ST mode and a SMT mode in accordance with one or more embodiments of the present invention.

Figure 9:
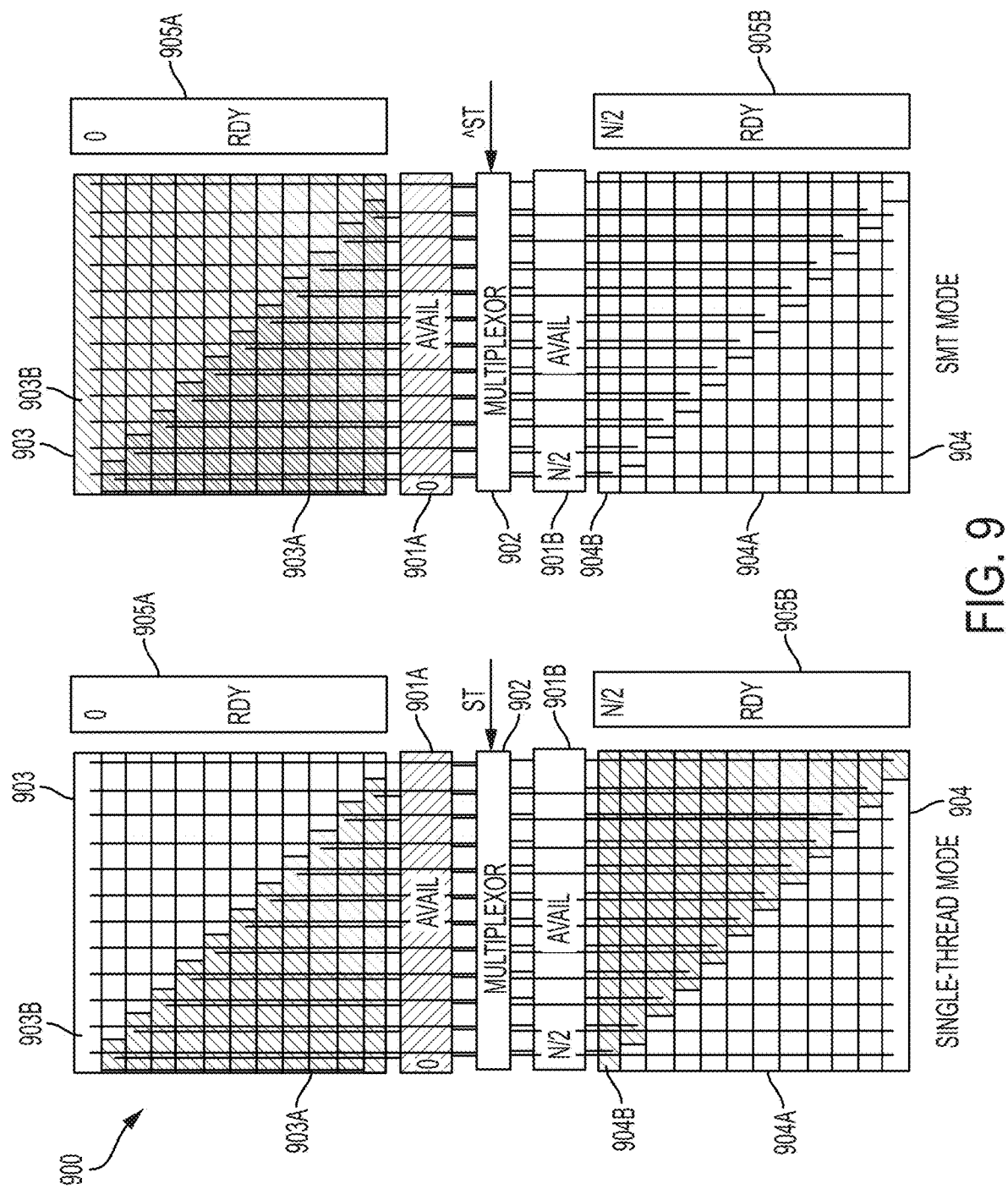
FIG. 9 depicts a block diagram of a dependency matrix operating in a single-thread (ST) mode and a simultaneous multi-threading (SMT) mode in accordance with one or more embodiments of the present invention.

Turning now to FIG. 9, the dependency matrix 900 shown in FIG. 9 includes a first half matrix 903 and a second half matrix 904 as described previously and that tracks for each of N instructions precise dependence on N/2 prior instructions. As shown in the embodiment of the present invention in FIG. 9, the source availability information is maintained in the available bit vector 901A, which is set after an instruction in row 0 to N/2−1 issues and by available bit vector 901B, which is set after an instruction in row N/2 to N−1 issues. The availability information is communicated to the dependency matrices 903 and 904 by N wires over each matrix. An instruction corresponding to a row in the first half matrix 903 with a dependency bit set within the illustrated lower triangular region of the matrix 903A receives availability information directly from bit vector 901A. Such an instruction with dependency bit set in illustrated upper triangular region 903B receives availability information via multiplexor 902. The multiplexor 902 can select between the bit vectors 901A and 901B, and in ST mode, the multiplexor 902 routes availability information from bit vector 901B to region 903B.

Similarly, an instruction corresponding to a row of second half matrix 904 that has a dependency bit set in illustrated lower triangular region 904A receives availability information from available bit vector 901B. Such an instruction with dependency bit set in illustrated upper triangular region 904B receives availability information from a second multiplexor within multiplexor 902. The multiplexor 902 can select between the bit vectors 901A and 901B, and in ST mode routes that information from available bit vector 901A to region 904B. With the multiplexor 902 operating as described, each row of the dependency matrix receives information corresponding to the availability of results produced by instructions in the prior N/2 rows. Since instructions are added to the issue queue in FIFO order, this corresponds to the prior N/2 instructions added to the queue. The right side of FIG. 9 illustrates the operation of an exemplary embodiment of the scalable dependency matrix in SMT mode. Under this condition, the multiplexor 902 conveys the availability information contained in available bit vector 901A and 901B to the upper right triangular portions 903B and 904B, respectively. Also shown in FIG. 9 are the status vectors 905A and 905B.

Consequently, an instruction corresponding to a given thread with dependency information contained in a row of the dependency matrix receives availability information corresponding to results produced by instructions in the same half of the issue queue, which corresponds to all instructions of the same thread. The exemplary embodiment of the present invention shown in FIG. 9 thus gives precise dependency tracking across all instructions of a given thread in SMT mode and precise dependency tracking across the prior N/2 instructions in ST mode, with imprecise tracking of older dependencies tracked by the summary bit.

One or more embodiments of the present invention described herein provide a scalable dependency matrix, wherein instead of requiring a dependency matrix that contains N rows by N columns, a dependency matrix of N rows by M (e.g., M=N/2) columns is provided with M being less than N. In addition, putting the instructions in the issue queue in FIFO ordering saves the area used by an age array and can improve performance of the issue queue.

Figure 10:
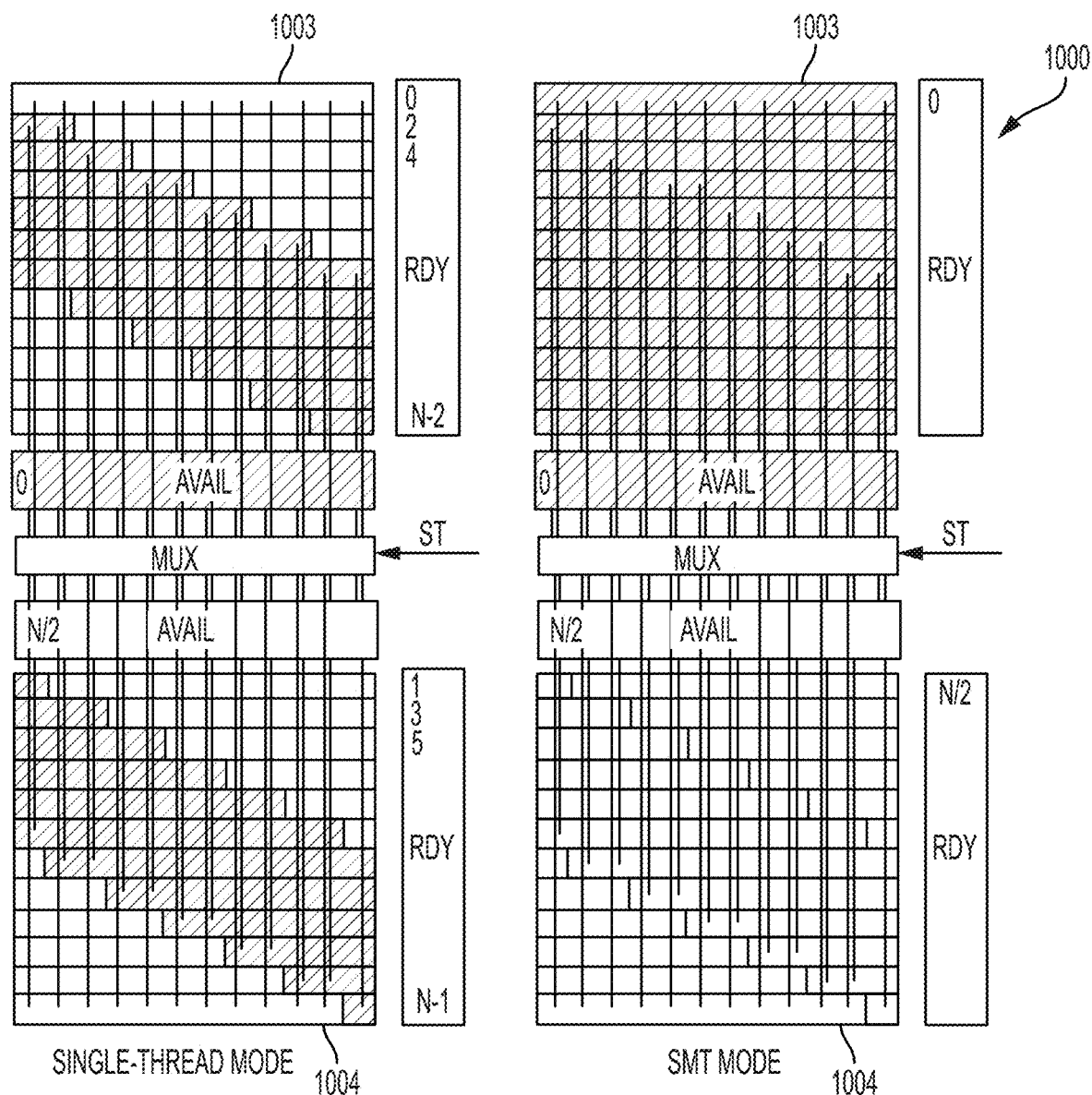
FIG. 10 depicts a block diagram of a dependency matrix operating in a ST mode and a SMT mode in accordance with one or more embodiments of the present invention.

Turning now FIG. 10, a block diagram of a dependency matrix 1000 operating in ST mode and SMT mode is generally shown in accordance with one or more embodiments of the present invention. The dependency matrices 1003 1004 shown in FIG. 10 are similar to those shown in FIG. 9 with a different permutation of the rows. It is the topology of the connections illustrated in FIG. 9 that enables the desired behavior in ST and SMT modes with the simple toggling between modes of the multiplexor control. Permutations of the rows in FIG. 9 that don't alter the connection topology are possible. One of many example permutations of the rows in FIG. 9 that does not alter the connection topology is shown in FIG. 10.

Figure 11:
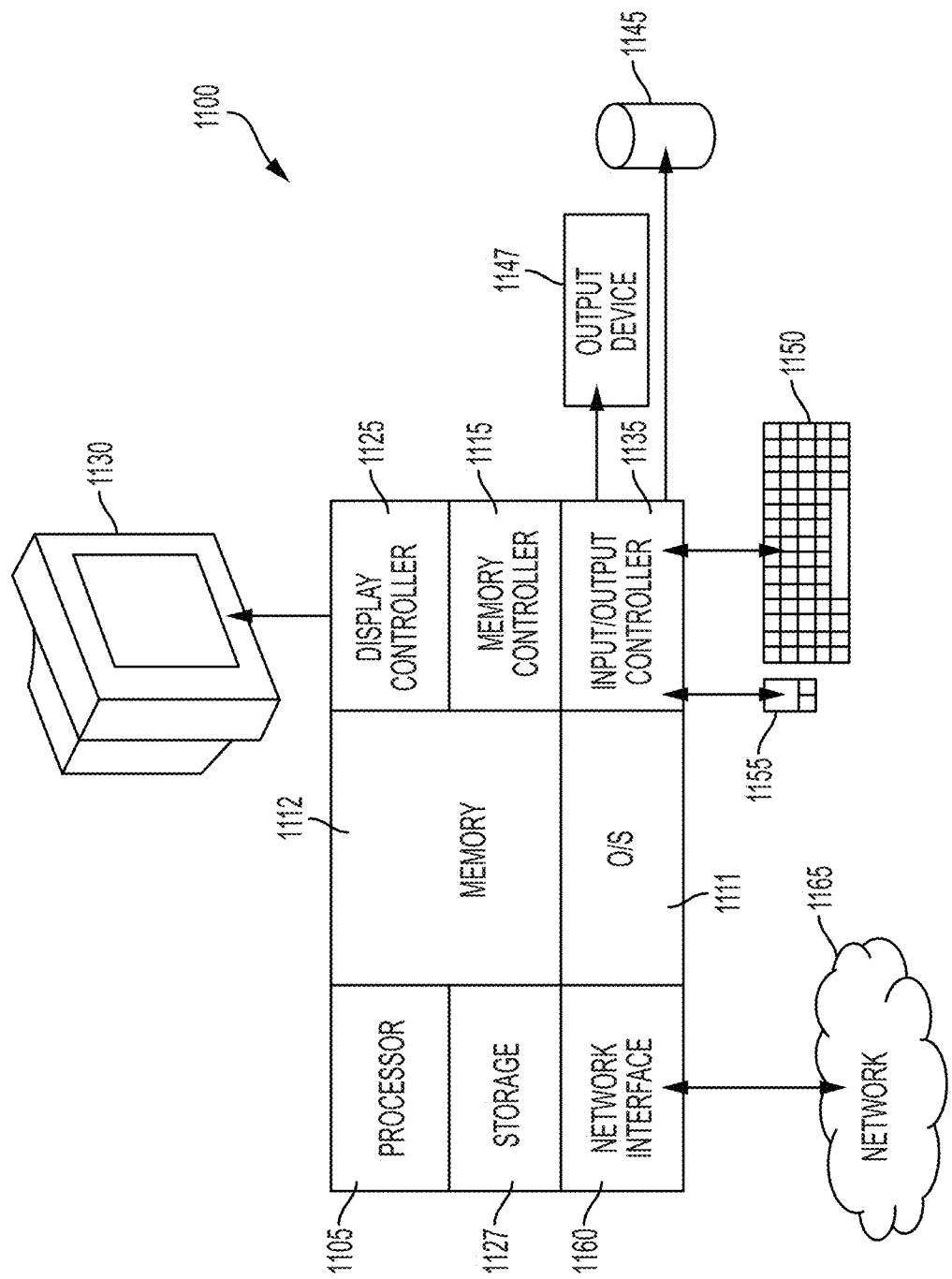
FIG. 11 is a block diagram of a computer system for implementing some or all aspects of a scalable dependency matrix with a summary bit in an OoO processor in accordance with one or more embodiments of the present invention.

Turning now to FIG. 11, a block diagram of a computer system 1100 for implementing some or all aspects of a scalable dependency matrix with a summary bit in an OoO processor is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1100, such as a mobile device, personal computer, workstation, minicomputer, or mainframe computer.

In an exemplary embodiment, as shown in FIG. 11, the computer system 1100 includes a processor 1105, memory 1112 coupled to a memory controller 1115, and one or more input devices 1145 and/or output devices 1147, such as peripherals, that are communicatively coupled via a local I/O controller 1135. These devices 1147 and 1145 may include, for example, a printer, a scanner, a microphone, and the like. A conventional keyboard 1150 and mouse 1155 may be coupled to the I/O controller 1135. The I/O controller 1135 may be, for example, one or more buses or other wired or wireless connections, as are known in the art. The I/O controller 1135 may have additional elements, which are omitted for simplicity, such as controllers, buffers (caches), drivers, repeaters, and receivers, to enable communications.

The I/O devices 1147, 1145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1105 is a hardware device for executing hardware instructions or software, particularly those stored in memory 1112. The processor 1105 may be a custom made or commercially available processor, a central processing unit (CPU), an auxiliary processor among several processors associated with the computer system 1100, a semiconductor based microprocessor (in the form of a microchip or chip set), a microprocessor, or other device for executing instructions. The processor 1105 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1112 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1112 may incorporate electronic, magnetic, optical, or other types of storage media. Note that the memory 1112 may have a distributed architecture, where various components are situated remote from one another but may be accessed by the processor 1105.

The instructions in memory 1112 may include one or more separate programs, each of which comprises an ordered listing of executable instructions for implementing logical functions. In the example of FIG. 11, the instructions in the memory 1112 include a suitable operating system (OS) 1111. The operating system 1111 essentially may control the execution of other computer programs and provides scheduling, input-output control, file and data management, memory management, and communication control and related services.

Additional data, including, for example, instructions for the processor 1105 or other retrievable information, may be stored in storage 1127, which may be a storage device such as a hard disk drive or solid state drive. The stored instructions in memory 1112 or in storage 1127 may include those enabling the processor to execute one or more aspects of the dispatch systems and methods of this disclosure.

The computer system 1100 may further include a display controller 1125 coupled to a display 1130. In an exemplary embodiment, the computer system 1100 may further include a network interface 1160 for coupling to a network 1165. The network 1165 may be an IP-based network for communication between the computer system 1100 and an external server, client and the like via a broadband connection. The network 1165 transmits and receives data between the computer system 1100 and external systems. In an exemplary embodiment, the network 1165 may be a managed IP network administered by a service provider. The network 1165 may be implemented in a wireless fashion, e.g., using wireless protocols and technologies, such as WiFi, WiMax, etc. The network 1165 may also be a packet-switched network such as a local area network, wide area network, metropolitan area network, the Internet, or other similar type of network environment. The network 1165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing a scalable dependency matrix as described herein can be embodied, in whole or in part, in computer program products or in computer systems 1100, such as that illustrated in FIG. 11.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   tracking dependencies between instructions in an issue queue, wherein the tracking comprises for each instruction in the issue queue:
      identifying whether the instruction is dependent on each of a threshold number of instructions added to the issue queue prior to the instruction, wherein a dependency between the instruction and each of the threshold number of instructions is tracked individually; and
      identifying whether the instruction is dependent on one or more other instructions in a group of instructions that includes instructions in the issue queue that were added to the issue queue prior to the instruction and that are not included in the threshold number of instructions that are tracked individually, wherein a dependency between the instruction and the one or more other instructions in the group of instructions is tracked by indicating that the instruction is dependent on the group of instructions; and
   issuing instructions from the issue queue based at least in part on the tracking, wherein:
      the dependency between the instruction and the group of instructions is tracked using a single summary bit that is set to indicate that a dependency exists between the instruction and the group of instructions; and
      subsequent to the single summary bit being set, the single summary bit is reset to indicate that the dependency no longer exists between the instruction and the group of instructions based at least in part on detecting that all of the instructions in the group of instructions have been issued from the issue queue.

2. The computer-implemented method of claim 1, wherein a dependency between the instruction and each of the threshold number of instructions is tracked using a separate bit for each of the threshold number of instructions.

3. The computer-implemented method of claim 1, wherein the issue queue is a first-in-first-out (FIFO) queue and the instructions in the issue queue are ordered based on an order that they were added to the issue queue.

4. The computer-implemented method of claim 1, wherein the instructions in the issue queue are from a single thread being executed by an out-of-order processor.

5. The computer-implemented method of claim 1, wherein the issue queue holds N instructions and the threshold number of instructions is N/2.

6. The computer-implemented method of claim 1, wherein the threshold number is programmable.

7. A system comprising:
a dependency matrix in an issue queue of an out-of-order processor;
a memory having computer readable instructions; and
one or more processors for executing the computer readable instructions, the computer readable instructions controlling the one or more processors to perform operations comprising:
tracking dependencies between instructions in the issue queue, wherein the tracking comprises for each instruction in the issue queue:
identifying whether the instruction is dependent on each of a threshold number of instructions added to the issue queue prior to the instruction, wherein a dependency between the instruction and each of the threshold number of instructions is tracked individually; and
identifying whether the instruction is dependent on one or more other instructions in a group of instructions that includes instructions in the issue queue that were added to the issue queue prior to the instruction and that are not included in the threshold number of instructions that are tracked individually, wherein a dependency between the instruction and the one or more other instructions in the group of instructions is tracked by indicating that the instruction is dependent on the group of instructions; and
issuing instructions from the issue queue based at least in part on the tracking, wherein:
the dependency between the instruction and the group of instructions is tracked using a single summary bit that is set to indicate that a dependency exists between the instruction and the group of instructions; and
subsequent to the single summary bit being set, the single summary bit is reset to indicate that the dependency no longer exists between the instruction and the group of instructions based at least in part on detecting that all of the instructions in the group of instructions have been issued from the issue queue.

8. The system of claim 7, wherein a dependency between the instruction and each of the threshold number of instructions is tracked using a separate bit for each of the threshold number of instructions.

9. The system of claim 7, wherein the issue queue is a first-in-first-out (FIFO) queue and the instructions in the issue queue are ordered based on an order that they were added to the issue queue.

10. The system of claim 7, wherein the instructions in the issue queue are from a single thread being executed by the out-of-order processor.

11. The system of claim 7, wherein the issue queue holds N instructions and the threshold number of instructions is N/2.

12. The system of claim 7, wherein the threshold number is programmable.

13. A computer program product comprising a non-transitory computer readable storage medium having program instructions embodied therewith, the program instructions executable by a processor to cause the processor to perform operations comprising:
tracking dependencies between instructions in an issue queue, wherein the tracking comprises for each instruction in the issue queue:
identifying whether the instruction is dependent on each of a threshold number of instructions added to the issue queue prior to the instruction, wherein a dependency between the instruction and each of the threshold number of instructions is tracked individually; and
identifying whether the instruction is dependent on one or more other instructions in a group of instructions that includes instructions in the issue queue that were added to the issue queue prior to the instruction and that are not included in the threshold number of instructions that are tracked individually, wherein a dependency between the instruction and the one or more other instructions in the group of instructions is tracked by indicating that the instruction is dependent on the group of instructions; and
issuing instructions from the issue queue based at least in part on the tracking, wherein:
the dependency between the instruction and the group of instructions is tracked using a single summary bit that is set to indicate that a dependency exists between the instruction and the group of instructions; and
subsequent to the single summary bit being set, the single summary bit is reset to indicate that the dependency no longer exists between the instruction and the group of instructions based at least in part on detecting that all of the instructions in the group of instructions have been issued from the issue queue.

* * * * *